March 17, 1931.  A. C. GILBERT  1,797,190
ORANGE JUICE EXTRACTOR
Filed July 2, 1927  2 Sheets-Sheet 1

Inventor
Alfred C. Gilbert
By Rockwell & Bartholow
Attorney

March 17, 1931.   A. C. GILBERT   1,797,190
ORANGE JUICE EXTRACTOR
Filed July 2, 1927   2 Sheets-Sheet 2

Inventor
Alfred C. Gilbert
By Rockwell & Bartholow
Attorney

Patented Mar. 17, 1931

1,797,190

UNITED STATES PATENT OFFICE

ALFRED C. GILBERT, OF HAMDEN, CONNECTICUT, ASSIGNOR, BY MESNE ASSIGNMENTS, TO THE A. C. GILBERT COMPANY, OF NEW HAVEN, CONNECTICUT, A CORPORATION OF MARYLAND

ORANGE-JUICE EXTRACTOR

Application filed July 2, 1927. Serial No. 203,175.

This invention relates to a juice extractor, and more particularly to a power driven juice extracting machine for extracting the juices of oranges, lemons, or other citrous fruits.

More specifically, the invention relates to a fruit juice extractor in which the juice is extracted by pressing cut fruits over a motor driven, upright extracting bulb, with provision for collecting the juice in a bowl surrounding the bulb, the juice being discharged from the bowl through a down spout into a cup, glass, or other receptacle.

In fruit juice extractors, it is desirable that the parts which come in contact with the juices may be readily cleansed, and as an object of my invention I contemplate a juice extractor of the above type in which the extracting bulb and the bowl for collecting the juice may be readily detached from the machine in order that they may be cleansed, the arrangement being preferably such that upon removal of the bulb and bowl the motor and driving connections become readily accessible.

The bulb and bowl of the extracting machine are usually carried directly above the motor and driving connections for the bulb, and there is considerable danger of the fruit juices flowing down into the motor and other mechanism.

As another object of my invention, I contemplate a simple means for preventing the fruit juices from penetrating the motor or other operative parts of the machine.

Still another object of my invention is to provide a novel driving means for the bulb which may be assembled as a unit with the motor and in which means is provided for taking up the end thrust on a bulb supporting and driving shaft, and preventing this thrust from being communicated to the bearings of the motor.

A still further object of my invention is to provide a machine of the above type which has relatively few and simple parts, many of which are adapted to be made of pressed sheet material, resulting in a device which may be cheaply and economically manufactured.

To these and other ends, the invention consists in the novel features and combination of parts to be hereinafter described and claimed.

Figure 1:
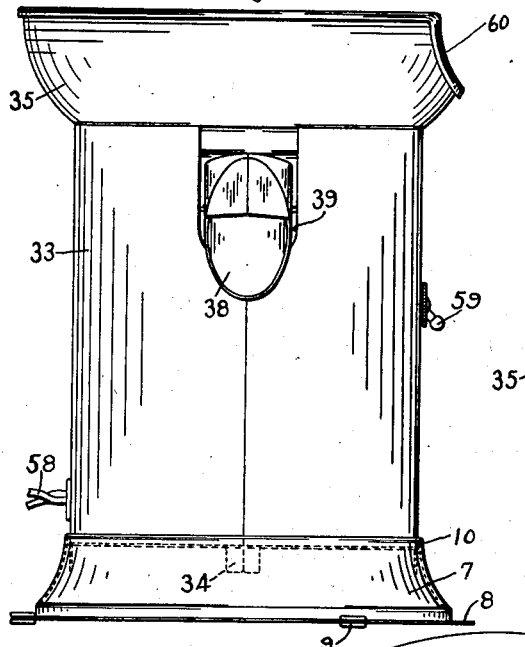
Fig. 1 is a front elevation of a juice extractor, according to my invention.
Figure 2:
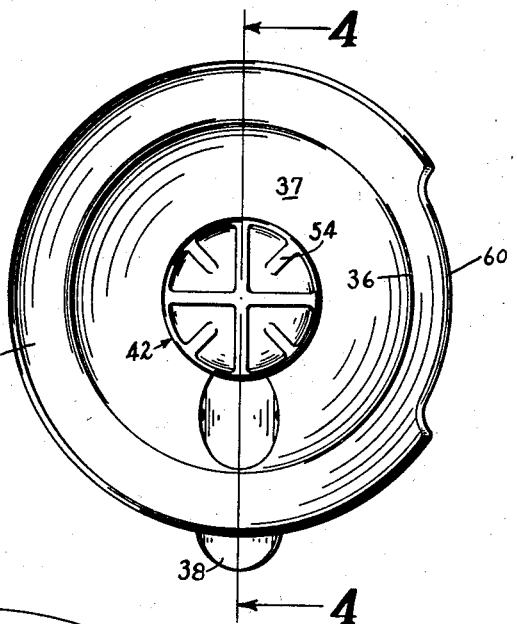
Fig. 2 is a plan view of the extractor shown in Fig. 1.
Figure 3:
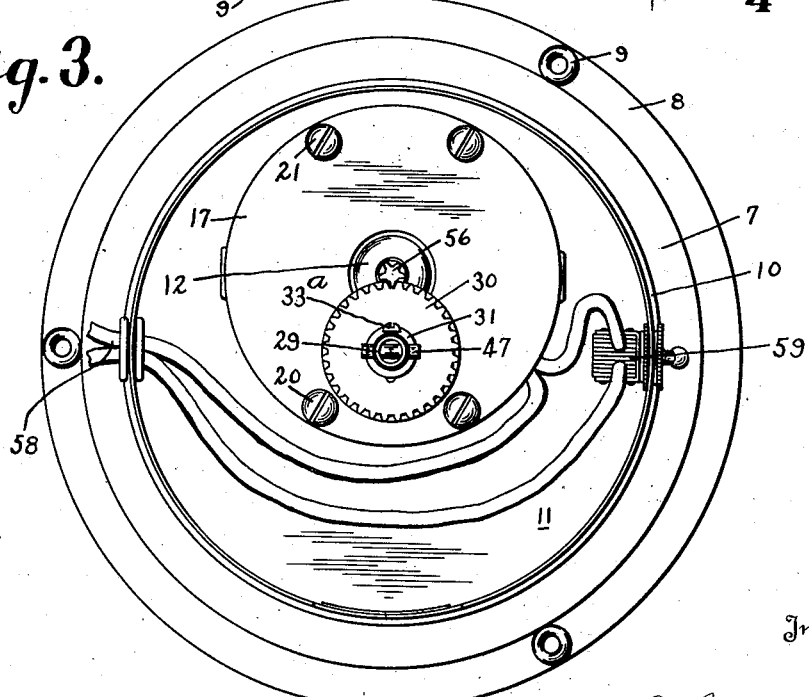
Fig. 3 is a plan view of the extractor, with the bulb and bowl removed, to show the interior arrangement of the motor and driving mechanism.
Figures 4, 5:
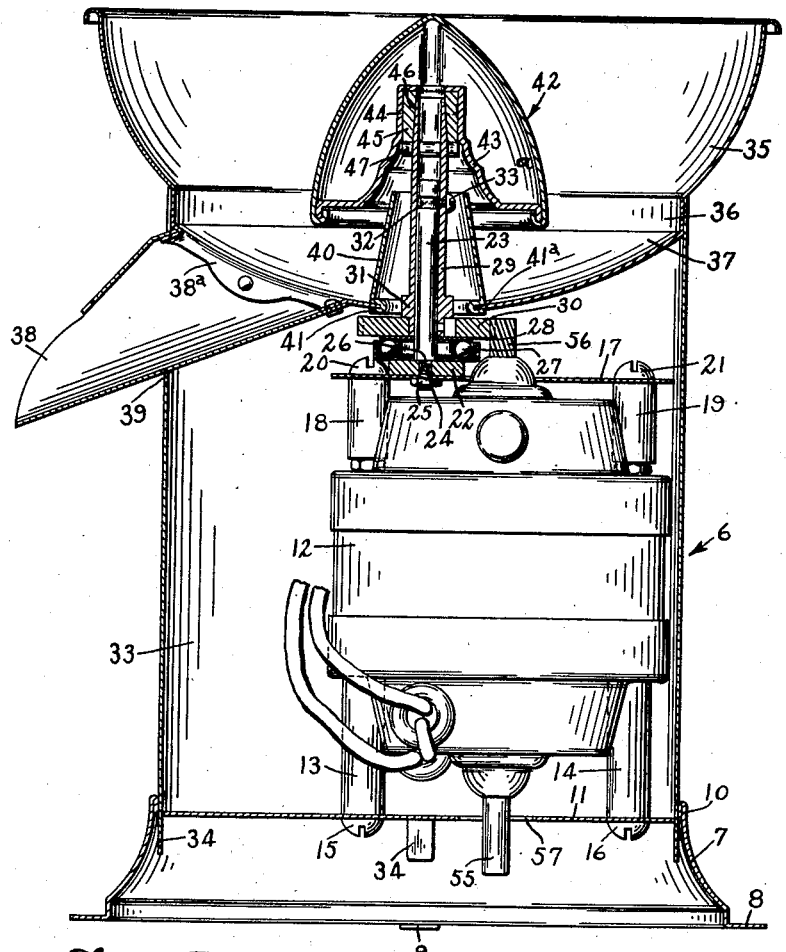
Fig. 4 is a sectional view, taken along line 4—4 of Fig. 2.
Fig. 5 is a sectional view of the extractor bulb at right angles to that shown in Fig. 4.

Referring to the drawings in which I have shown a preferred embodiment of my invention, the reference numeral 6 designates in general my improved juice extractor, which has a base 7, preferably but not necessarily, pressed out of sheet material, having on its lower end an outwardly extending flange 8, provided with inserts of rubber 9, on which the device may rest, an upwardly extending peripheral rim 10, and an internal wall or supporting element 11. Mounted on the wall or element 11 is an electrical motor 12, supported by a plurality of sleeves of which two, 13 and 14, are shown, the motor being secured to the wall 11, by means of screws, such as 15 and 16, which pass through the wall 11 and into sleeves 13 and 14.

Supported on the upper end of the motor 12 is a plate or supporting element 17, spaced from the motor by a plurality of sleeves, of which two, 18 and 19, are shown, and secured against displacement by screws 20 and 21, passing through the plate 17 and into sleeves 18 and 19. On the upper face of plate 17 is a thrust collar 22, and supported on the thrust collar 22 is a vertical stud or post 23, having a reduced and threaded end 24, passing through thrust collar 22 and plate 17, and secured against displacement by a nut 25, the post 23, having a shoulder 26, resting on the upper face of the thrust plate 22, the shoulder 26 and nut 25 holding the thrust collar 22 and plate 17 securely together. Supported on the upper face of the thrust supporting plate 22, and surrounding the post 23 is a ball bearing 27, provided with a preferably hardened thrust plate 28, and resting on the upper surface of the plate 28, and received on the post 23, is a shaft 29, which in this instance is hollow having secured on the lower end thereof, and supported on the plate 28 a gear 30. Immediately above the gear 30, the shaft 29 is provided with an annular shoulder 31 adapted to transmit the thrust from shaft 29 to gear 30 and bearing 27. In the upper end of the post 23 is a transverse groove 32, and having its end received therein is a screw 33ª, passing through and secured in the shaft 29 for detachably holding the shaft on the stud.

Supported on the wall 11 of the base 7 is a cylindrical casing 33, preferably but not necessarily, made of sheet metal bent into cylindrical form and provided with tabs 34, extending through suitable slots in the wall 11, and securing the casing 33 thereto. The cylindrical casing 33 fits tightly within and is secured against outward displacement by the flange 10. On the upper end of the casing 33 is a bowl 35, having a cylindrical portion 36 tightly but detachably received within the upper end of the casing 33, and a cupped out lower portion 37, having a down spout 38, secured thereon by means of flange 38ª. The cylindrical casing 33 is cut away at 39 to form a notch communicating with the open upper end of the casing and provide clearance for the spout 38. In the bottom of the bowl 35 and centrally thereof is an upwardly extending guard 40, having its lower end 41 spun around the edges of, or otherwise secured in an opening 41ª in the bowl 35. The upper part of the bowl is of greater diameter than the motor casing and extends beyond the motor casing both laterally and upwardly to a substantial extent. The bowl has a bottom juice-holding wall disposed within the motor-containing casing, and it has a side wall interiorly supporting the upper edge of the sheet metal casing, the upper portion of the bowl being integrally joined to said side wall and extending laterally therefrom just above the upper edge of the casing, and being curved outwardly and upwardly to present a flaring portion extending about an extractor bulb. The substantially cylindrical portion of the bowl is engaged in the upper end of the casing, and the downwardly and outwardly inclined spout leads from the bottom portion of the bowl between the guard 40 and the wall of said cylindrical portion, and the spout is received in the notch in the upper end of the casing when the bowl is lowered into operative position.

On the upper end of the shaft 29 is a bulb 42 comprising a thimble 43, having secured in its substantially cylindrical upper end 44 a sleeve 45. The sleeve 45 preferably has its outer surface milled or knurled, and the cylindrical portion 44 of thimble 43 is pressed into tight engagement with the milled surface of the sleeve 45. The sleeve 45 is provided with a tapered opening 46, resting on the upper end of the shaft 29, which is provided with a similar taper at this point, and a pin 47 is secured in the shaft 29 and carried within slots 48, provided in the sleeve 45. The lower end of the thimble 43 has an outwardly extending wall 49, provided on its outer edge with a downwardly extending annular flange 50. The bulb 42 has an outer shell 51, provided with curved side walls 52, the lower ends of which are spun, or otherwise secured, around the flange 50, as shown at 53. On the outer walls 52 of the bulb 42 are ribs 54, for a purpose to be hereinafter described.

The shaft 55 of the motor 12 has on its upper end a helical gear 56, in mesh with the gear 30, and the lower end of shaft 55 extends through an opening 57 in wall 11, this opening providing means for ventilating the extractor casing and keeping the motor cool. Electric current may be supplied to the motor 12, by means of wires 58, connected to any suitable source of power, and controlled by a switch 59. The side wall of the bowl 35 is cut away, as shown at 60, to provide a clearance for the hand or wrist of the operator.

In operation, the switch 59 is tripped and current supplied to the motor. The rotation of the motor shaft 55 and the gear 56 drives the gear 30 and the shaft 29, and through the pin 47 and the sleeve 45, rotates the bulb 42. An orange or lemon, which has previously been cut in halves, is pressed onto the rotating bulb 42, and the ribs 54 grind the interior of the orange or lemon, the juice falling into the bowl 35 and running out through the spout 38 into a glass, or other receptacle, held thereunder. As the bulb 42 rotates, any juice collected thereon below the fruit will be thrown off by centrifugal force onto the walls of the bowl 35 and will run out through the spout 38. The guard 40 being carried to a substantial height above the spout 38, and above the lower edge of the bulb 42, there is no danger of the fruit juice overflowing the bowl and passing down to the motor and driving mechanism below.

The thrust on shaft 29, due to the pressure of the fruit on bulb 42, is taken up by the thrust bearing 27 and transmitted to the plate 17, and hence to the base of the machine by means of the sleeves and the motor casing. In this manner, no thrust is exerted on the bearings of the motor.

When it is desired to wash the parts of the machine which come in contact with the fruit juices, it is simply necessary to pull the bulb 42 off the tapered end of the shaft 29 and lift the bowl 35 out of the upper end of the casing 33, whereupon the bulb and bowl may be washed separately from the machine. The removal of the bowl 35 exposes the motor and driving mechanism which may be readily cleaned, adjusted or oiled.

The motor and connected mechanism for rotating the bulb are assembled together as a unit. By this arrangement, it is possible to relieve the side walls of the casing and bowl from supporting any of the operative parts of the machine, and the casing and bowl may be made of sheet material bent or stamped into shape.

By my improvements a fruit juice extractor is provided which is especially well adapted for household use. The device can be handled and operated with great convenience and after use can be readily cleansed and can be easily kept in a clean sanitary condition. It will be observed that no bolts, screws, or similar fastening devices are required for securing the bowl in the operative position, and that after the use of the extractor for expressing the juice from the fruit, the bowl can be removed with great facility for rinsing under a faucet without the need of releasing any such fasteners. When it is desired to detach the bowl it is simply necessary to remove the extractor bulb and then, by grasping the bowl, to lift it vertically out of the seat in or against which it is held during the extraction of juice. The bowl can be lifted or raised by a movement in which all points thereof traverse parallel lines, or, in other words, by a simple upward rectilinear movement of the juice-holding vessel without any necessity of tipping or twisting the same. Similarly, the reseating of the bowl when it has been cleansed can be effected very easily and expeditiously as it is simply necessary to aline the spout with the spout notch in the casing and then lower the bowl into place in operative relation to the casing without the need of tipping or twisting the bowl in this movement, and also without any requirement of fastening the bowl in its seat after it has been placed in the latter, although, manifestly, I do not limit myself in all aspects of the invention to a structure in which no bowl-securing fasteners are employed. Moreover, the absence of fastening bolts for the bowl, or like projecting parts, facilitates the maintenance of the casing portion of the device in a clean, sanitary condition. So far as I am aware, I am the first to provide a juice extractor having a quick detachable bowl which can be removed and replaced in the simple and convenient manner above described, or in any similar manner, and wherein the bowl is at all times freely liftable vertically from its operative position and wherein the bowl, when occupying a definite angular relation to the casing, may be lowered with respect thereto by a purely translatory movement so that as it reaches its lowermost position it is engaged or held automatically by means which prevent its turning on its axis, but which, on the other hand, do not in any way interfere with the lifting thereof for detachment and cleaning. Furthermore, these advantages are realized in a construction having simple and relatively few parts and which can be manufactured readily and at comparatively slight cost.

While I have shown and described a preferred embodiment of my invention, it will be understood that the same is not to be limited to all the details shown, but is capable of modification and variation within the spirit of the invention and the scope of the appended claims.

What I claim is:

1. In an orange juice extractor, a base, a casing mounted on said base, a motor supported on said base within said casing, an upright shaft supported on said motor, driving mechanism between said motor and shaft, a bowl mounted on the upper end of said casing and having said shaft extending upwardly therethrough, and a bulb mounted on the upper end of said shaft within said bowl, said motor, rotatable shaft and driving connections being supported on said base out of contact with said casing and the bowl mounted thereon.

2. In an orange juice extractor, a casing, a motor supported within said casing, a plate carried on the casing of said motor, a post secured to said plate out of alignment with the motor shaft, a rotatable hollow shaft on said post, driving connections between said motor and hollow shaft, a bowl on said casing, said hollow shaft extending through said bowl, and a bulb on the end of said hollow shaft within said bowl.

3. In an orange juice extractor, a casing, a vertical motor supported on its lower end within said casing, a plate carried on the upper end of said motor, a vertical post secured to said plate, a rotatable shaft on said post, driving connections between said motor and shaft, a detachable bowl on the upper end of said casing, said shaft extending upwardly through said bowl, and a bulb on the upper end of said shaft within said bowl.

4. In an orange juice extractor, a casing, a motor supported within said casing, a plate supported on said motor, a post secured to said plate, a rotatable shaft mounted on said post, a gear on the lower end of said shaft, a second gear driven by said motor, in mesh with said first named gear, a bowl supported on the upper end of said casing, said shaft extending upwardly through said bowl, and a bulb on the upper end of said shaft within said bowl.

5. In an orange juice extractor, a casing, a motor supported within said casing, a plate supported on said motor, a post secured to said plate, a rotatable shaft mounted on said post, a gear on the lower end of said shaft, an anti-friction bearing between said gear and plate, a second gear driven by said motor, in mesh with said first named gear, a bowl supported on the upper end of said casing, said shaft extending upwardly through said bowl, and a bulb on the upper end of said shaft within said bowl.

6. In an orange juice extractor, a casing, a motor supported within said casing, a plate carried on said motor, a thrust collar on said plate, a post extending through said collar and plate and securing them together, an anti-friction bearing, supported on said collar, a rotatable hollow shaft on said post and supported on said anti-friction bearing, driving connections between said motor and shaft, a bowl on the upper end of said casing, said shaft extending upwardly through said bowl, and a bulb on the upper end of said shaft.

7. In an orange juice extractor, a casing, a motor supported within said casing, a rotatable hollow shaft supported above said motor, means for driving the shaft from said motor, a bulb on the upper end of said shaft, and means including a part within said shaft to provide an extended bearing therefor and for preventing thrust from said bulb from being communicated to the bearings of said motor.

8. In an orange juice extractor, a base, a cylindrical casing supported on said base, said cylindrical casing being composed of a sheet bent into cylindrical form, tabs on the lower end of the cylinder, said base being provided with openings for the reception of said tabs, and a freely detachable bowl mounted at the upper end of said cylindrical casing and having its lower end telescoped within the casing.

9. In an orange juice extractor, a base, said base including an upwardly extending peripheral rim and an outwardly extending supporting portion on which said base is adapted to rest, an upright cylindrical casing supported on said base within said rim, a freely detachable bowl mounted at the upper end of said casing and means for preventing turning of the bowl relatively to the casing.

10. In an orange juice extractor, a casing open at its upper end, a motor in said casing having a shaft, a freely detachable bowl mounted on and closing the upper end of said casing, driving mechanism connected to said motor shaft and supported in said casing between said motor and bowl, said mechanism including a shaft offset from the motor shaft and extending through said bowl, and a bulb on the upper end of said extending shaft, said motor and driving mechanism being accessible from the exterior of said casing upon the removal of said bowl.

11. In an orange juice extractor, an upright casing open at its upper end, a motor in said casing, a freely detachable bowl mounted on the upper end of said casing and serving as a closure therefor, driving mechanism supported above said motor adjacent the upper end of said casing, said motor and driving mechanism being mounted in said casing independently of and out of contact with said casing side wall and bowl, said mechanism having a shaft extending upwardly through said bowl, and a bulb on the upper end of said extending shaft, said driving mechanism being accessible from the exterior of said casing upon the removal of said bowl.

12. In an orange juice extractor, an upright casing having an open upper end, a detachable bowl mounted on the upper end of said casing, driving mechanism in said casing immediately below said bowl, a portion of said driving mechanism extending through said bowl, a bulb removably mounted on said extending portion within said bowl, and power means for said driving mechanism, said casing being unobstructed between said driving mechanism and bowl whereby the driving mechanism is freely accessible upon removal of the bowl.

13. In an orange juice extractor, a base, a motor supported on said base including a casing, and a shaft, a second shaft supported on said motor, said second shaft having its axis parallel to but spaced from the motor shaft, driving connections between said shafts, a bowl mounted above said motor and having said second shaft extending upwardly therethrough, and a bulb mounted on the upper end of said second shaft within said bowl, said second shaft being hollow and a bearing post mounted interiorly thereof.

14. In an orange juice extractor, a pair of spaced supporting elements, a motor mounted between and secured to each of said elements, a casing having one end thereof mounted on one of said elements, an upright post supported on the other of said elements, a rotatable hollow shaft mounted on said post, driving connections between said motor and shaft, a bowl mounted on the upper end of said casing and having said shaft extending upwardly therethrough, and a bulb mounted on the upper end of said shaft within said bowl.

15. In an orange juice extractor, a pair of spaced supporting elements, a motor mounted between and connected to both of said elements, an upright shaft supported on one of said elements, driving mechanism between said motor and shaft, a casing mounted on the other of said elements, said casing being out of contact with said motor, the other of said spaced elements and the driving mechanism mounted thereon, a bowl mounted on the upper end of said casing, and having said shaft extending upwardly therethrough, and a bulb mounted on the upper end of said shaft within said bowl.

16. In an orange juice extractor a motor, said motor including a motor casing, a plate secured to said motor casing at an upper portion thereof, a bowl above said motor and plate, a shaft supported on said plate and extending through said bowl, a bulb on said shaft within said bowl, and a driving connection between said motor and shaft.

17. In a fruit juice extractor, a sheet metal casing open at its upper end, a spout opening extending downwardly from the upper edge of the casing, a bowl having an upper enlarged portion and a lower substantially straight sided portion to snugly engage the upper open end of the casing walls to support the same, and said bowl having a spout received in the spout opening.

18. A fruit juice extractor comprising an upright casing formed of a piece of sheet material having its ends brought together and secured to form a laterally closed body, said casing being open at its upper end, a bowl closing the upper end of the casing and having a portion snugly engaging the upper edge thereof to support the same, a spout opening adjacent the upper end of the casing and extending through the upper edge thereof at the meeting edges of the casing wall, and said bowl being provided with a spout received in said opening.

19. A juice extractor comprising a casing, a motor within the casing having a shaft, a post supported above the motor, a hollow shaft rotatably mounted on the post in offset postion relatively to the motor shaft, driving mechanism connecting the motor shaft and the hollow shaft, a bowl mounted at the upper end of the casing, said hollow shaft extending upwardly through the bowl, and an extractor bulb non-rotatably connected to said hollow shaft.

20. A juice extractor comprising a casing, a motor supported within the casing, a supporting plate connected to the motor, a post secured to said plate, a rotatable shaft mounted on the post, a gear on the lower end of said shaft, a second gear driven by the motor in mesh with the first named gear, a bowl supported on the upper end of the casing, said shaft extending upwardly through said bowl and having an extractor bulb on its upper extended end.

21. A juice extractor comprising a casing, a motor within the casing, a supporting plate connected to the motor, a post secured to said plate, a rotatable shaft mounted on the post, a gear on the lower end of said shaft, and an anti-friction bearing between said gear and plate, a second gear driven by the motor in mesh with the first named gear, a bowl supported on the upper end of the casing, said shaft extending upwardly through said bowl and having an extractor bulb on its upper extended end.

22. A juice extractor comprising a casing, a motor member mounted within said casing and having a shaft, a second shaft disposed above the motor, supporting means connected directly to the motor member and serving to rotatably support said second shaft against longitudinal thrust, driving connections between the motor shaft and the second shaft, a bowl supported at the upper end of the casing, and said second shaft extending upwardly within the bowl and having an extractor bulb on its upper end.

23. A juice extractor comprising a casing, a motor member mounted within said casing and having a shaft, a second shaft disposed above the motor, supporting means rigidly connected to an adjacent surface of the motor member and serving to rotatably support said second shaft against longitudinal thrust, driving connections between the motor shaft and the second shaft, a bowl supported at the upper end of the casing, and said second shaft extending upwardly within the bowl and having an extractor bulb on its upper end, and means supported by the motor providing an extended bearing for said second shaft.

24. In a juice extractor, a casing, a motor member within the casing and having a shaft, a plate mounted above and supported by the motor member through which the motor shaft extends upwardly, a second shaft supported by and above said plate, a bowl supported at its upper end of the casing, said second shaft extending upwardly within the bowl and having an extractor bulb mounted upon its upper end, and driving connections between said second shaft and said motor shaft.

25. In a juice extractor, a casing, a motor member within the casing and having a shaft, a plate mounted within the casing, above and connected to the motor member through which the motor shaft extends upwardly, a second shaft supported by and wholly above said plate, a bowl supported at the upper end of the casing, said second shaft extending upwardly within the bowl and having an extractor bulb mounted upon its upper end, said second shaft being offset with relation to the motor shaft and in driving connection therewith.

26. In a fruit juice extractor, a casing, a motor member mounted therewithin and including a motor casing, a plate above the motor and secured to an upper portion of the casing thereof, a bowl above the motor and plate, a shaft supported on said plate and extending through the bowl, a bulb on said shaft within the bowl, and a driving connection between the motor and shaft.

27. In a fruit juice extractor, a casing, a motor member mounted therewithin including a motor casing, a plate above the motor and secured to an upper portion of the casing thereof, a bowl above the motor and plate, a vertical post supported on said plate, a hollow shaft rotatably mounted on said post and extending through the bowl, a bulb on said shaft within the bowl, and a driving connection between said motor and the hollow shaft.

28. A fruit juice extractor comprising a casing, a supporting plate and a motor mounted within the casing and rigidly secured together at the under surface of said plate, said plate being disposed above said motor, a shaft rotatably supported upon said plate in parallel offset relation to the motor shaft, a bowl mounted at the upper end of the casing, said rotatably supported shaft extending through the bowl and having an extractor bulb mounted on its upper end, and driving connections between the rotatably supported shaft and the motor shaft.

29. A fruit juice extractor comprising a casing, a supporting member and a motor member mounted within the casing, said supporting member being disposed above said motor member and secured to the upper portion of the motor member, a shaft rotatably supported by said supporting member, a bowl mounted at the upper end of the casing, said rotatably supported shaft extending through the bowl and having an extractor bulb mounted on its upper end, and driving connections between the rotatably supported shaft and the motor shaft.

30. In a fruit juice extractor, a casing comprising an upright wall, and a plate extending transversely thereof, the wall and plate being secured together, a power driving mechanism supported by said plate, said driving mechanism including a motor having a shaft, a second shaft disposed above the motor and in offset relation with the motor shaft, a driving connection between the motor shaft and the second named shaft, a bowl supported at the upper end of the casing, and said second named shaft extending through the bowl and having an extractor bulb mounted on the upper end thereof.

31. A fruit juice extractor comprising a casing, and a motor mounted therein, a shaft mounted within the casing above the motor, supporting means for said shaft secured directly to the motor casing, means carried by said supporting means providing an extended bearing for said shaft, a bowl carried at the upper end of the casing, an extractor bulb within the bowl on the upper end of said shaft, and driving connections between the motor and said shaft.

32. In a fruit juice extractor, a hollow casing open at the upper end, the wall of said casing being provided with a cut-away portion opening through the upper edge thereof, a bowl received telescopically within the upper end of the casing to close the same, said bowl having a spout received in the cut-away portion of the casing wall.

33. In a fruit juice extractor, an open ended casing, a bowl nested in the open end of the casing and closing the same, a power driven extractor shaft mounted in the casing and projecting upwardly through an opening in the bottom of the bowl, a thrust bearing supporting said extractor shaft from beneath, and an upper bearing for said extractor shaft supported independently of the bowl and extending above the bottom of the bowl.

34. In a fruit juice extractor, an open ended casing, a bowl closing the open end of the casing, a vertically disposed electric motor mounted in the casing, an extractor shaft arranged parallel to and driven from the motor shaft and projecting upwardly through an opening in the bottom of the bowl, an upstanding guard on the bowl bottom surrounding said last-named opening, a thrust bearing secured to the motor and supporting said extractor shaft from beneath, and an upper bearing for said extractor shaft independent of said bowl and disposed within said guard.

35. In a fruit juice extractor, an open ended casing, a bowl extending across the open end of the casing, a vertically disposed electric motor mounted in the casing, an extractor shaft member driven from the motor and projecting upwardly into the bowl, a bearing member for supporting the extractor shaft independently of the bowl and secured to said electric motor, one of said members being hollow and the other solid, and an extractor bulb mounted on the upper end of the extractor shaft within the bowl.

36. In a fruit juice extractor, a casing open at its upper end, a bowl extending across the upper open end of the casing, the bowl having an opening in the bottom thereof, an extractor shaft member extending upwardly into the bowl through the opening in the bottom thereof and a bearing member therefor, one of said members being hollow and the other solid and one of said members embracing the other, an electric motor for driving said extractor shaft having a motor shaft arranged parallel to said extractor shaft and geared thereto, means in said casing extending beneath said extractor shaft member and said bearing member and supporting them from beneath against downward thrust on the extractor shaft, and an extractor bulb mounted on the upper end of said extractor shaft.

37. In a fruit juice extractor, a casing, a bowl supported at the upper end of the casing, an electric motor mounted in the casing and having a vertically disposed motor shaft, an extractor shaft member arranged parallel to and driven from the motor shaft, and projecting upwardly through an opening in the bottom of the bowl, and a bearing member for said extractor shaft member supported from beneath in the casing independently of the bowl, one of said members being hollow and the other solid, and said members engaging each other above the bowl bottom over an extended area to firmly support the extractor shaft member for rotation, independently of the bowl.

38. In a fruit juice extractor, a casing, a bowl supported at the upper end of the casing, an electric motor mounted in the casing and having a vertically disposed shaft, an extractor shaft member arranged parallel to and driven from the motor shaft and projecting upwardly through an opening in the bottom of the bowl, a bearing member engaging said extractor shaft member over a considerable area above the bowl bottom for supporting it firmly independently of the bowl, and means to which the motor is attached, forming a bottom support for said extractor shaft member and said bearing member.

39. In a fruit juice extractor, a casing, a bowl extending across the upper end of the casing, an electric motor mounted in the casing and having a vertically disposed shaft, an extractor shaft member arranged parallel to and driven from the motor shaft and projecting upwardly through an opening in the bottom of the bowl, a bearing member engaging said extractor shaft member over a considerable area above the bowl bottom for supporting it firmly independently of the bowl, and means to which the motor is attached, forming a bottom support for said extractor shaft member and said bearing member, said extractor shaft member being hollow and surrounding said bearing member and having a screw engaging a transverse groove in the bearing member for preventing separation of said members.

40. In a fruit juice extractor, an open ended casing, a bowl nested in the open end of the casing and closing the same, an electric motor mounted in the casing and having a vertically disposed shaft, an extractor shaft arranged parallel to and driven from the motor shaft member and projecting upwardly through an opening in the bottom of the bowl, a bearing member for said extractor shaft member mounted independently of the bowl and engaging the extractor shaft member above the bottom of the bowl over an extended area, a thrust bearing mounted beneath the lower end of the extractor shaft, and means mounted above and connected to the motor casing for supporting said thrust bearing and said bearing member for the extractor shaft member independently of the bowl and the lateral walls of the casing, a guard projecting upwardly from the bowl bottom around but clear of the extractor shaft member and the bearing member therefor, and a bulb mounted on top of the extractor shaft.

41. In a fruit juice extractor, a motor member having a casing and shaft, a support secured to the upper part of the motor casing, a shaft rotatably mounted on said support, driving means connecting said shaft to the motor shaft, a thrust bearing on said support to carry the thrust from said rotatable shaft, and an extractor bulb on said last named shaft, a casing surrounding the motor and a base for said casing, said base supporting the motor and the parts driven thereby.

42. In a fruit juice extractor, a casing, a motor having a shaft mounted within said casing, a support mounted above the motor and secured thereto and having an upright post mounted thereon, a hollow extractor bulb shaft on said post, means to drive said last named shaft from the motor shaft, and a thrust bearing on said support to carry the thrust of the hollow shaft.

43. In a fruit juice extraction, a base, a casing thereon, a motor supported by the base within the casing and having a shaft, a support above the motor and secured to an adjacent part thereof, an extractor bulb shaft rotatably mounted on said support in offset relation to the motor shaft, a thrust bearing on said support to carry the thrust of the extractor bulb shaft, and driving means connecting said last named shaft to the motor shaft.

44. In a fruit juice extractor, a base, a casing mounted on the base, a motor supported on said base within the casing, an upright rotatable shaft supported on said motor, driving connections between the motor and said shaft, a bowl mounted on the upper end of said casing and having said shaft extending upwardly therethrough, and a bulb mounted on the upper end of said shaft within the bowl, said motor rotatable shaft and driving connections being supported from said base out of contact with the casing.

45. A fruit juice extractor comprising a casing, a motor member supported within said casing, supporting means carried by said motor member, a rotatable shaft and a bearing therefor both supported from below by said supporting means, one of said members being hollow and the other disposed within said hollow member, a bowl mounted at the upper end of the casing, said shaft extending into the bowl and having an extractor bulb mounted on its upper end, and driving connections between said shaft and the motor.

46. A fruit juice extractor comprising a pair of spaced supporting elements, one above the other a motor mounted between and connected to both of said elements, an upright rotatable shaft supported on the upper of said elements, driving mechanism connecting the motor and said shaft, a casing mounted on the other of said elements out of contact with the motor and driving mechanism, a bowl mounted at the upper end of the casing and having said shaft extending upwardly therethrough and a bulb on the upper end of said shaft within the bowl.

47. A fruit juice extractor comprising a casing, a bowl mounted at the upper end of the casing, a vertically disposed electric motor mounted in the casing below the bowl, an extractor shaft member driven from the motor and projecting upwardly into the bowl, a bearing member for supporting the extractor shaft independently of the bowl, one of said members being hollow and the other solid, and an extractor bulb mounted on the upper end of the extractor shaft within the bowl, said bearing member being supported from the motor.

48. In a fruit juice extractor, a base, a hollow casing having its lower end resting on the base and an open upper end, a bowl having an upper flaring bowl-shaped portion, a bottom portion sloping toward the bowl center, a spout leading out of the bottom portion of the bowl from a point adjacent the center thereof through a cut-away portion of the casing communicating with the open upper end of said casing, and a substantially straight-sided section between the bottom and the upper portion of the bowl, and reduced in size relatively to the upper portion, said straight-sided portion being nested snugly in the open upper end of the casing.

49. In a fruit juice extractor, a base, a casing resting on the base at its lower end and open at its upper end, a spout opening formed by a notch communicating with the upper open end of the casing, a sheet metal bowl having a lower reduced portion with a vertical wall telescopically received and snugly fitting in the upper end of the casing, and an enlarged upper portion serving as a shoulder to abut against the upper edge of the casing, said bowl having a spout projecting through the spout opening.

50. In a fruit juice extractor, a casing open at its upper end, there being a spout opening extending downwardly from the upper edge of the casing, and a bowl having a flaring upper portion and a lower portion conforming to the upper open end of the casing, to snugly engage the same, said bowl having a spout received in said opening.

51. In a fruit juice extractor, an open-ended casing having a notched portion in its open end, and a bowl having a depending portion set in and fitting with frictional engagement the open end of the casing and having a laterally directed spout adapted to be received in said notched portion and lie therein when the bowl is set in the casing.

52. In a fruit juice extractor, a motor, drive mechanism operated by the motor including a shaft, a casing extending about the motor and drive mechanism, a rotary juice extracting tool removably mounted on said shaft, and a bowl for receiving the juice having an operative seat from which it is freely liftable for cleansing and into which it is lowerable by a movement of translation and in which the bowl as received is held against turning movement, said bowl having a spout leading from the bottom thereof to discharge juice exteriorly of the casing.

53. In a fruit juice extractor, a motor, drive mechanism operated by the motor including a shaft, a casing extending about the motor and drive mechanism, a rotary juice extracting tool removably mounted on said shaft, and a bowl for receiving the juice having a seat at the upper end of said casing for holding it firmly and from which it is freely liftable and into which it is lowerable without tipping and in which the bowl as received is held against movement in a horizontal plane, said bowl having an exteriorly discharging spout.

54. In a fruit juice extractor, a motor, drive mechanism operated by the motor including a shaft, a casing extending about the motor and drive mechanism, a rotary juice extracting tool removably mounted on said shaft, a bowl for receiving the juice having a seat from which it is freely liftable and into which it is lowerable by a movement of translation and in which the bowl as received is held against turning on its axis, and a table-engaging base for the extractor from which said casing extends upwardly, said seat being located at the upper end of said casing and adapted to hold said bowl firmly in place as said bowl is lowered into the same, and said bowl having a spout to discharge juice exteriorly of the casing.

55. A fruit juice extractor having a motor-containing main casing, a motor driven extractor bulb removably mounted adjacent one end of the casing, a juice-receiving bowl enclosing said bulb and having a quick detachable connection with said extractor by which the bowl is firmly held in operative position without fastening it to the casing and is at all times freely liftable from the extractor for cleaning, said bowl being lowerable into operative position by a translatory movement, a spout leading from the bowl to discharge juice exteriorly of the casing, and means for holding the bowl against angular movement when it is lowered into operative position.

56. In a fruit juice extractor, the combination of a table-engaging base, an upstanding motor-containing casing rising from said base and constructed of sheet metal and having an open upper end, a bowl having between its top and bottom a portion of intermediate diameter nested in and frictionally engaging the open upper end of said casing and supporting it interiorly, a motor-driven extractor bulb removably disposed within said bowl, said bowl being firmly held in operative position by engagement with said casing but without being fastened thereto and being readily liftable out of the casing for cleaning, and a spout leading from the bowl to discharge juice exteriorly of the casing.

57. A fruit juice extractor having a motor-containing main casing provided with a body portion of thin sheet metal open at the top, a removably mounted motor-driven extractor bulb adjacent the upper end of the casing, a bowl enclosing said bulb and having a bottom juice-holding wall disposed within said motor-containing casing and having a side wall interiorly supporting the upper edge of said sheet metal body portion and co-acting therewith to position the bowl removably in said casing, said bowl also having an upper portion of substantially greater diameter than the motor casing integrally joined to said side wall and extending laterally therefrom and curved outwardly and upwardly, said bowl being liftable from and lowerable into operative position without the necessity of tipping the same, and a spout leading downwardly and outwardly from the bowl and co-acting with said casing to limit movement of the bowl about a vertical axis when the bowl is in its operative position.

58. A bowl for a fruit juice extractor having a cupped bottom portion, an upwardly and outwardly curved side wall, a substantially cylindrical portion of intermediate diameter within the bowl between the bottom and the upper flaring portion of the bowl, the bottom at its middle portion having an aperture therein, an upstanding guard surrounding said aperture, and a downwardly and outwardly inclined spout leading out of the bottom of the bowl between said guard and the wall of said substantially cylindrical portion of intermediate diameter, said spout being closed over at the upper part thereof.

59. In a fruit juice extractor, the combination of a table-engaging base, a sheet metal casing rising from the base and having an open upper end, said casing comprising a sheet of material having its ends brought together and interconnected, the ends of said sheet being cut away to form a notch at the upper end of the casing, a bowl having an upper flaring portion of greater diameter than the casing, a cupped bottom portion, a substantially cylindrical portion of intermediate diameter between the bottom and the upper flaring portion of the bowl, and a downwardly and outwardly inclined spout leading from the bottom portion of the bowl between the center thereof and the wall of said cylindrical portion, said spout being located in said notch in the casing, and said substantially cylindrical portion of the bowl being engaged in the upper end of the casing and supporting the same interiorly, and a motor-driven extractor bulb removably mounted in the bowl.

60. In a fruit juice extractor, a table-engaging base, a main casing of sheet metal rising from said base and open at its upper end, a motor in said casing, a vertical shaft driven by the motor above the upper end of the casing, an extractor bulb removably mounted on said shaft, a sheet metal bowl enclosing said extractor bulb and having a portion of greater diameter than the casing located above the upper end of the latter, and another portion of less diameter than the casing projecting down into the upper edge portion of said casing to support it interiorly, said casing having in its side wall a notch communicating with the upper open end thereof, and a downwardly and outwardly inclined discharge spout on said bowl which lies in said notch when said bowl is in operative position, said bowl being removable from said casing by a vertical translatory movement.

61. A fruit juice extractor having a motor-containing main casing open at its upper end, a motor-driven extractor bulb removably mounted adjacent said open upper end of the casing, a juice-receiving bowl enclosing said bulb and closing the open upper end of the casing and having a quick detachable connection with said extractor by which the bowl is firmly held in operative position, said bowl being lowerable into operative position and removable from operative position by a vertical translatory movement, said quick detachable connection between the bowl and the extractor comprising a depending portion on the bowl fitting within the upper edge portion of the casing, said bowl having a flaring upper portion of substantially greater diameter than the upper end portion of the casing and provided with a bottom juice-holding wall located substantially below the upper edge of the casing when the bowl is in the operative position, and a spout on the bowl for discharging juice exteriorly of the casing.

62. In a fruit juice extractor, a table-engaging base, a main casing rising therefrom having an electric motor mounted therein, said casing being open at the upper end, a motor-driven extractor bulb removably mounted adjacent the open upper end of the casing, a juice-receiving bowl having a readily detachable connection with and adapted to close the upper end of the casing and comprising an upwardly and outwardly curved upper portion of substantially greater diameter than the upper part of the casing extending to a substantial degree upwardly beyond the casing, said bowl also having a portion extending downwardly into and fitting within the upper edge portion of the casing and being provided with a bottom juice-holding wall spaced downwardly from the upper edge of the casing, said bowl being removable from operative position by a vertical translatory movement, and a spout on the bowl for discharging juice exteriorly of the casing.

In witness whereof, I have hereunto set my hand this 1st day of July, 1927.

ALFRED C. GILBERT.